United States Patent
Kuboshima et al.

(10) Patent No.: US 7,310,941 B2
(45) Date of Patent: Dec. 25, 2007

(54) EXHAUST GAS PURIFICATION SYSTEM FOR INTERNAL COMBUSTION ENGINE

(75) Inventors: Tsukasa Kuboshima, Okazaki (JP); Shigeto Yahata, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/334,463

(22) Filed: Jan. 19, 2006

(65) Prior Publication Data

US 2006/0179826 A1    Aug. 17, 2006

(30) Foreign Application Priority Data

Feb. 15, 2005    (JP) .............................. 2005-037160

(51) Int. Cl.
*F01N 3/00*        (2006.01)
(52) U.S. Cl. .............................. 60/297; 60/288; 60/295; 60/311
(58) Field of Classification Search ................... 60/285, 60/287, 288, 291, 295, 297, 311
See application file for complete search history.

(56) References Cited

U.S. PATENT DOCUMENTS

| | | | |
|---|---|---|---|
| 6,574,956 B1 * | 6/2003 | Moraal et al. ................. | 60/295 |
| 6,758,039 B2 | 7/2004 | Kuboshima et al. | |
| 6,983,591 B2 * | 1/2006 | Kondo et al. .................. | 60/295 |
| 7,104,051 B2 * | 9/2006 | Shimasaki et al. ............. | 60/297 |
| 7,111,455 B2 * | 9/2006 | Okugawa et al. .............. | 60/295 |
| 7,159,392 B2 * | 1/2007 | Kondoh et al. ................ | 60/297 |
| 7,171,803 B2 * | 2/2007 | Saito et al. .................... | 60/297 |
| 2003/0230079 A1 | 12/2003 | Kuboshima et al. | |

FOREIGN PATENT DOCUMENTS

| | | |
|---|---|---|
| JP | 2003-83035 | 3/2003 |
| JP | 2005-299585 | 10/2005 |

* cited by examiner

*Primary Examiner*—Binh Q. Tran
(74) *Attorney, Agent, or Firm*—Nixon & Vanderhye P.C.

(57) ABSTRACT

An exhaust gas purification system has a first accumulation quantity estimation device that estimates an accumulation quantity of exhaust particulate matters collected by a diesel particulate filter (DPF) based on a flowing state of exhaust gas and a second accumulation quantity estimation device that estimates the accumulation quantity based on an operating state of an engine. The first estimation device is employed only when a flow rate of the exhaust gas is equal to or greater than a predetermined value and the engine is in a steady operating state. Otherwise, the second estimation device is employed. The exhaust gas flow rate is increased if the estimation by the second estimation device continues for a long time. Thus, an opportunity to perform the accumulation quantity estimation with the first estimation device is increased, and accumulation accuracy is improved.

22 Claims, 8 Drawing Sheets

EXHAUST GAS PURIFICATION SYSTEM FOR INTERNAL COMBUSTION ENGINE

CROSS REFERENCE TO RELATED APPLICATION

This application is based on and incorporates herein by reference Japanese Patent Application No. 2005-37160 filed on Feb. 15, 2005.

BACKGROUND OF THE INVENTION

1. Field of the Invention

The present invention relates to an exhaust gas purification system of an internal combustion engine. Specifically, the present invention relates to a system having multiple estimation devices that estimate a particulate matter accumulation quantity during a regeneration period of a particulate filter.

2. Description of Related Art

Improvement of exhaust emission of an internal combustion engine of an automobile or the like has been required. Specifically, a diesel engine that uses diesel oil as fuel has to eliminate exhaust particulate matters such as soot in addition to gaseous components such as carbon monoxide, hydrocarbon or nitrogen oxides contained in exhaust gas. Therefore, a particulate filter is located in an exhaust passage to collect the exhaust particulate matters.

If the exhaust gas entering the particulate filter flows downstream and passes through porous partition walls of the particulate filter, the exhaust particulate matters are collected at wall surfaces or pores of the partition walls of the particulate filter. If a quantity of the collected exhaust particulate matters increases excessively, a gas flow resistance at the particulate filter will increase. Accordingly, a back pressure of the engine will increase and an engine output will decrease. Therefore, it is necessary to combust and eliminate the exhaust particulate matters collected in the particulate filter at suitable timing to regenerate an ability of the particulate filter to collect the exhaust particulate matters.

Usually, an accumulation quantity of the exhaust particulate matters (quantity of the exhaust particulate matters accumulated in the particulate filter) is estimated, and the regeneration of the particulate filter is performed when the estimated accumulation quantity reaches a predetermined value. A method (first estimation method) estimates the accumulation quantity of the exhaust particulate matters accumulated in the particulate filter based on a gas-flowing state in the particulate filter. The first estimation method is based on the fact that the gas flow resistance increases as the accumulation quantity of the exhaust particulate matters increases. A pressure difference sensor senses a differential pressure between an inlet and an outlet of the particulate filter, and the method estimates the accumulation quantity based on the sensed value.

Another method (second estimation method) estimates the accumulation quantity based on an engine operation history. The second estimation method senses operating states such as rotation speed or output torque of the engine. The method calculates a generation quantity of the exhaust particulate matters generated by an engine main body, and integrates the generation quantity to estimate the accumulation quantity of the exhaust particulate matters. The second method beforehand prepares a map representing a relationship between the operating state of the engine and the generation quantity of the exhaust particulate matters based on data obtained through bench experimentation and the like.

An exhaust gas purification system described in JP-A-2003-83035 constantly performs both of the accumulation quantity estimation based on the first estimation method and the accumulation quantity estimation based on the second estimation method. If either one of the estimated accumulation quantities exceeds a set value, the system operates temperature increasing device to perform compulsory regeneration of the particulate filter. By using the two estimation methods at the same time, even if a trouble is caused or an error increases in either one of the two methods, the compulsory regeneration can be suitably performed based on the other estimation method to prevent excessive increase of the accumulation quantity.

The first estimation method can perform the estimation accurately because the first estimation method directly senses a degree of clogging. However, if a flow rate of the exhaust gas passing through the particulate filter decreases, the differential pressure will decrease and sensing accuracy of the accumulation quantity will decrease. In a transitional state, a stable differential pressure cannot be obtained, and the accumulation quantity of the exhaust particulate matters cannot be necessarily estimated at sufficient accuracy.

The second estimation method does not directly sense the state of the particulate filter but regards the quantity of the exhaust particulate matters discharged from the engine as the accumulation quantity in the particulate filter, and the second estimation method integrates an anticipated value of the accumulation quantity. This type of estimation contains a variation in the discharge quantity due to a variation in an engine individual body, a change in the operating state (constant speed drive and acceleration/deceleration drive), a change with time (change in characteristics after long-term drive) or environmental changes (temperature, air pressure and the like) as errors. Therefore, if the second estimation method continues for a long time, there is a possibility that the error will accumulate and the estimation accuracy of the accumulation quantity will be deteriorated.

The system described in JP-A-2003-83035 starts the regeneration operation if the estimate of the accumulation quantity of the first or second estimation methods exceeds the same set value. However, in the case where the regeneration operation is started based on the estimate of the second estimation method, the estimation accuracy is relatively low. Therefore, in such a case, there is a possibility that the actual accumulation quantity is too large (actual quantity>estimate). If the particulate filter is regenerated in a state in which the actual accumulation quantity is too large, there is a possibility that the temperature of the particulate filter will increase abnormally and the particulate filter will be damaged due to heat generation caused by combustion of the exhaust particulate matters. If the regeneration operation is performed frequently to avoid the excessive accumulation of the particulate matters, a fuel consumption will be deteriorated.

SUMMARY OF THE INVENTION

It is therefore an object of the present invention to provide an exhaust gas purification system of an internal combustion engine capable of performing regeneration operation of a particulate filter safely and efficiently by accurately estimating accumulation quantity of exhaust particulate matters in the particulate filter, while preventing excessive accumulation of the exhaust particulate matters and achieving appropriate regeneration frequency.

According to an aspect of the present invention, an exhaust gas purification system of an internal combustion engine has a flowing state sensing device, a first accumulation quantity estimation device, an operating state sensing device, a second accumulation quantity estimation device, an employment condition determination device, and regeneration start accumulation quantity calculation device. The exhaust gas purification system regenerates a particulate filter by eliminating exhaust particulate matters collected by the particulate filter. The flowing state sensing device senses a flowing state of the exhaust gas at the particulate filter. The first accumulation quantity estimation device estimates an accumulation quantity of the exhaust particulate matters in the particulate filter based on the flowing state of the exhaust gas. The operating state sensing device senses an operating state of the engine. The second accumulation quantity estimation device estimates the accumulation quantity of the exhaust particulate matters in the particulate filter based on the operating state of the engine. The employment condition determination device determines whether conditions to employ the first accumulation quantity estimation device including a condition that a flow rate of the exhaust gas flowing through the exhaust passage is equal to or greater than a predetermined flow rate are satisfied. The regeneration start accumulation quantity calculation device includes an estimation error calculation device that calculates an estimation error representing a correction value of the first or second accumulation quantity estimation device with respect to a limit accumulation quantity of the exhaust particulate matters in the particulate filter. The regeneration start accumulation quantity calculation device calculates a regeneration start accumulation quantity for starting the regeneration of the particulate filter by subtracting the estimation error of the first or second accumulation quantity estimation device from the limit accumulation quantity.

The accumulation quantity estimation by the first accumulation quantity estimation device is performed when the employment conditions such as a condition that the exhaust gas flow rate is sufficiently large are satisfied. Otherwise, the accumulation quantity estimation by the second accumulation quantity estimation device is performed. Thus, high estimation accuracy is maintained. An estimation error does not accumulate in the accumulation quantity estimation by the first accumulation quantity estimation device. The estimation error is integrated in the accumulation quantity estimation by the second accumulation quantity estimation device, and the estimation accuracy is deteriorated. Therefore, regeneration start accumulation quantities are set in accordance with degrees of the respective estimation errors. Thus, the regeneration can be performed at suitable timing and excessive accumulation of the exhaust particulate matters can be prevented when the estimation is performed by either one of the accumulation quantity estimation devices. Meanwhile, an appropriate regeneration frequency is achieved to prevent deterioration of fuel consumption.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENTS

Figure 1:
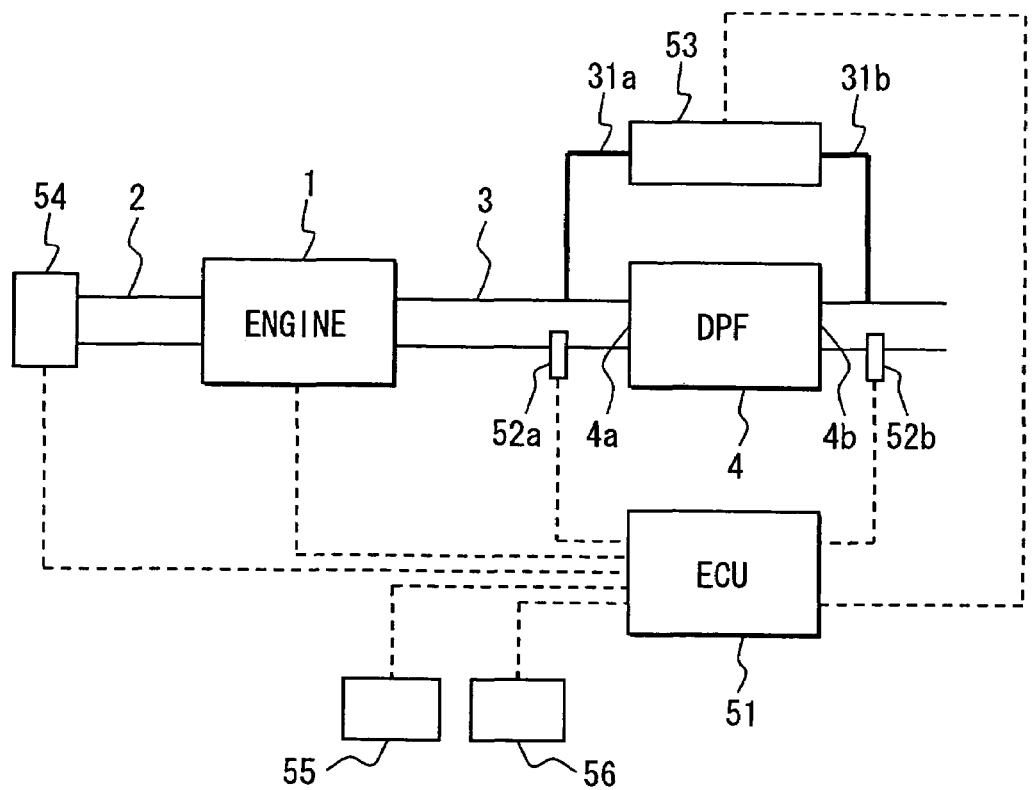
FIG. 1 is a schematic diagram showing an exhaust gas purification system of an internal combustion engine according to a first example embodiment of the present invention.

Referring to FIG. 1, an exhaust gas purification system of a diesel engine 1 according to a first example embodiment of the present invention is illustrated. As shown in FIG. 1, an intake passage 2 and an exhaust passage 3 are connected to the diesel engine 1. Intake air passes through the intake passage 2, and exhaust gas discharged from engine cylinders passes through the exhaust passage 3. A diesel particulate filter (DPF) 4 is located in the exhaust passage 3. A filter main body of the DPF 4 is formed of porous ceramics such as cordierite in the shape of a honeycomb body having multiple flow passages. An inlet or an outlet of each flow passage of the DPF 4 is blocked. The exhaust gas discharged from the cylinders of the engine 1 flows into the DPF 4 through an inlet 4a of the DPF 4 and passes through porous partition walls of the DPF 4 toward an outlet 4b of the DPF 4. At that time, exhaust particulate matters contained in the exhaust gas are collected by the DPF 4 and accumulate as an operation period elapses.

An oxidation catalyst containing a noble metal such as platinum or palladium as a main component is supported by the surface of the filter main body of the DPF 4. The exhaust particulate matters are oxidized, combusted and eliminated under a predetermined temperature condition. Alternatively, a separate oxidation catalyst may be located upstream of the DPF 4.

An electronic control unit (ECU) 51 controls various parts of the engine 1 such as injectors. The ECU 51 controls a fuel injection quantity or fuel injection timing to achieve an optimum operating state. The ECU 51 controls regeneration of the DPF 4 and monitors an accumulating state of the exhaust particulate matters in the DPF 4. Thus, the exhaust particulate matters are combusted and eliminated at suitable timing. The ECU 51 is general one structured centering on a microcomputer.

The ECU 51 receives various types of signals for comprehending the operating state of the engine 1 and a flowing state of the exhaust gas passing through the DPF 4. The exhaust passage 3 is equipped with temperature sensors 52a, 52b as flowing state sensing devises. The temperature sensors 52a, 52b penetrate a pipe wall of the exhaust passage 3. The temperature sensors 52a, 52b sense exhaust gas temperature. The temperature sensor 52a is located immediately upstream of the DPF 4, and the temperature sensor 52b is located immediately downstream of the DPF 4. The upstream temperature sensor 52a senses the temperature of the exhaust gas at the inlet 4a of the DPF 4 (DPF inlet temperature). The downstream temperature sensor 52b senses the temperature of the exhaust gas at the outlet 4b of the DPF 4 (DPF outlet temperature). The ECU 51 calculates the temperature of the DPF 4 (DPF temperature) from the DPF inlet temperature and the DPF outlet temperature.

The exhaust passage 3 is connected with a first branch passage 31a and a second branch passage 31b. The first branch passage 31a branches from the exhaust passage 3 immediately upstream of the DPF 4. The second branch passage 31b branches from the exhaust passage 3 immediately downstream of the DPF 4. A differential pressure sensor 53 as a flowing state sensing device is interposed between the both branch passages 31a, 31b to sense a differential pressure between the inlet 4a and the outlet 4b of the DPF 4. A pressure loss at the DPF 4 increases as the accumulation quantity of the exhaust particulate matters (PM accumulation quantity) in the DPF 4 increases. The differential pressure across the DPF 4 increases as the pressure loss at the DPF 4 increases.

An air flow meter 54 as a flowing state sensing device is located in the intake passage 2. The air flow meter 54 senses a flow rate of the intake air. Engine rotation speed is comprehended from an output signal of an engine rotation speed sensor 55 as an operating state sensing device. An accelerator position is comprehended from an output signal of an accelerator position sensor 56 as an operating state sensing device.

Figure 2:
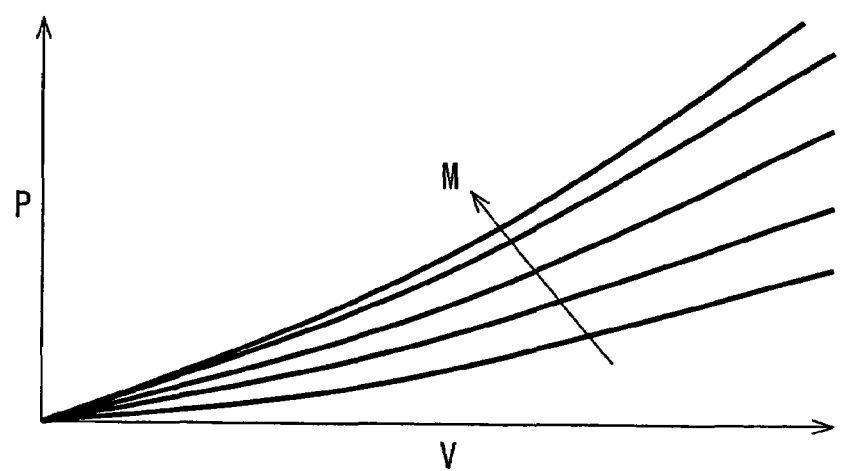
FIG. 2 is a graph showing a method of estimating a particulate matter accumulation quantity with a first accumulation quantity estimation device according to the FIG. 1 embodiment.

The ECU 51 comprehends the flowing state at the DPF 4 from the differential pressure of the DPF 4 sensed by the differential pressure sensor 53 and the flow rate of the exhaust gas passing through the DPF 4. The ECU 51 (first accumulation quantity estimation device) estimates the PM accumulation quantity based on the flowing state. The flow rate of the exhaust gas is calculated based on the intake air quantity sensed by the air flow meter 54 and the DPF temperature comprehended from the outputs of the temperature sensors 52a, 52b. As shown in FIG. 2, generally, the differential pressure P increases as the PM accumulation quantity M increases with respect to a certain exhaust gas flow rate V. The PM accumulation quantity M can be calculated based on this relationship.

Figure 3:
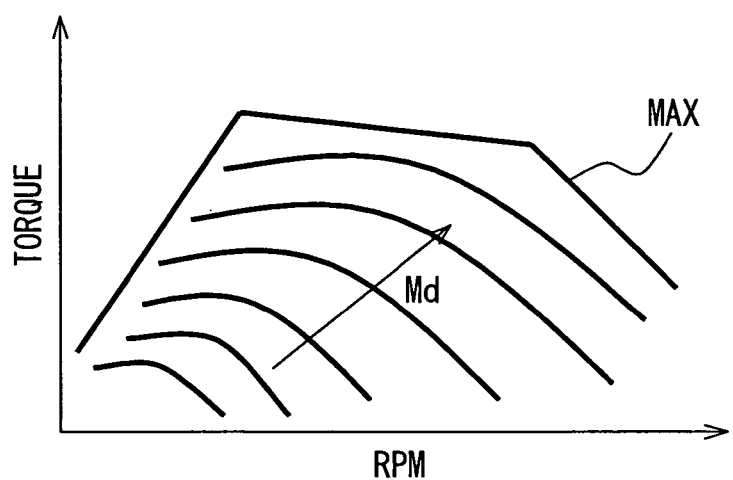
FIG. 3 is a graph showing a method of estimating the particulate matter accumulation quantity with a second accumulation quantity estimation device according to the FIG. 1 embodiment.

An operation history of the engine 1 is comprehended based on the engine rotation speed sensed by the engine rotation speed sensor 55 and the accelerator position sensed by the accelerator position sensor 56. The ECU 51 (second accumulation quantity estimation device) estimates the PM accumulation quantity M based on the operation history of the engine 1. As shown in FIG. 3, a certain correlation exists between the operating state of the engine 1 (engine rotation speed RPM and engine output torque) and the PM discharge quantity (quantity of the exhaust particulate matters discharged by the engine main body) Md. A solid line MAX in FIG. 3 indicates the maximum torque. The PM accumulation quantity M can be calculated by integrating the PM discharge quantity Md per unit time.

The first accumulation quantity estimation device can perform the estimation accurately. However, as shown in FIG. 2, if the exhaust gas flow rate V is low, a sufficient differential pressure P is not generated, and the estimation accuracy will be deteriorated. Accordingly, an employment condition to employ the first accumulation quantity estimation device should be set so that the employment condition is satisfied when the exhaust gas flow rate V is equal to or greater than a predetermined value V0, above which sufficient estimation accuracy can be obtained. The estimation by the first accumulation quantity estimation device is performed if this condition is satisfied. A stable differential pressure P cannot be obtained and an error will increase during a transitional operation period. Therefore, the employment condition of the first accumulation quantity estimation device should be set so that the employment condition is satisfied when the exhaust gas flow rate V is equal to or greater than the predetermined value V0 and the engine 1 is in a substantially steady operating state. The steady operation of the engine 1 is determined based on indexes indicative of the operating state of the engine 1 such as the engine rotation speed, the accelerator position, the intake air quantity, or the exhaust gas temperature. If a change in the index per unit time is equal to or less than a predetermined value, it is determined that the engine 1 is in the steady operating state.

When the above employment condition of the first accumulation quantity estimation device is not satisfied, the estimation by the second accumulation quantity estimation device is performed. If the estimation by the second accumulation quantity estimation device continues for a long time, the estimation accuracy will be deteriorated. Therefore, the continuing state of the estimation by the second accumulation quantity estimation device is sensed. If the estimation by the second accumulation quantity estimation device has continued for at least a predetermined period within which sufficient accuracy can be obtained, processing for compulsorily increasing the exhaust gas flow rate is performed (exhaust gas flow rate increasing device). A continuing state sensing device senses the continuing state from a continuing distance or a continuing period, through which the accumulation quantity estimation has continued, or from an integrated value of the fuel injection quantity injected during the continuing period, for example. An exhaust gas flow rate increasing device increases the exhaust gas flow rate to the predetermined value V0 or over if the value indicative of the continuing state becomes equal to or greater than a predetermined value A0. Thus, an opportunity to satisfy the employment condition of the first accumulation quantity estimation device is increased, and the estimation accuracy is improved. The exhaust gas flow rate increasing device increases the flow rate of the exhaust gas by performing at least one of reduction of exhaust gas recirculation (EGR), increase of an opening degree of an intake air throttle, increase of idling rotation speed, and restriction of a variable turbocharger.

The ECU 51 operates a temperature increasing device to increase the temperature of the DPF 4 to predetermined temperature or over if the estimate of the PM accumulation quantity estimated by the first or second accumulation quantity estimation device becomes a predetermined value or over. Thus, the regeneration operation to combust and eliminate the exhaust particulate matters is performed. The temperature increasing device performs post-injection or retardation of injection timing during the fuel injection by the injector. The retardation of the injection timing reduces an efficiency of a heat cycle and increases waste heat. Alternatively, the temperature increasing device may decrease the opening degree of the intake throttle from a usual opening degree. The temperature increasing device performs at least one of the above temperature increasing methods to increase the exhaust gas temperature.

Figure 4:
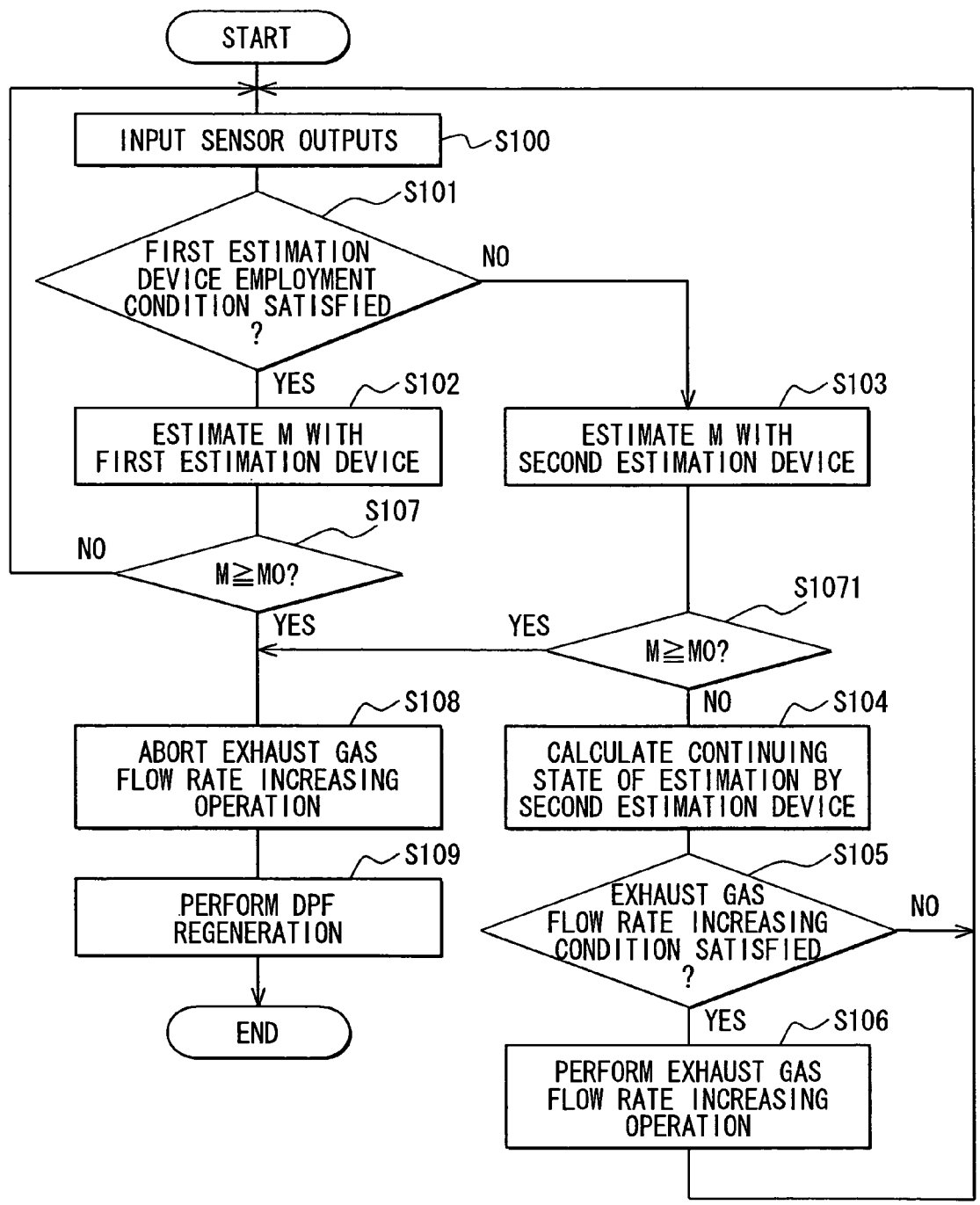
FIG. 4 is a flowchart showing processing steps of diesel particulate filter regeneration control performed by an electronic control unit of the exhaust gas purification system according to the FIG. 1 embodiment.

The ECU 51 performs control shown by a flowchart of FIG. 4 during the regeneration operation of the DPF 4. The flowchart shown in FIG. 4 is a program started in a predetermined cycle by timer interruption. First, at Step S100, various sensor outputs are input from the temperature sensors 52a, 52b, the differential pressure sensor 53, the air flow meter 54, the accelerator position sensor 56, and the engine rotation speed sensor 55.

At Step S101, it is determined whether the employment condition of the first accumulation quantity estimation device is satisfied or not based on the information of the sensors input at Step S100. First, the exhaust gas flow rate V is calculated based on the intake air quantity GA sensed by the air flow meter 54, the DPF temperature T sensed by the temperature sensors 52a, 52b and the differential pressure P sensed by the differential pressure sensor 53. In this calculation, the intake air quantity GA as a mass flow rate is converted into a volumetric flow rate based on the DPF temperature T and the differential pressure P. Any temperature representing the temperature of the DPF 4 may be employed as the DPF temperature T. For example, the DPF temperature T may be represented by an output calculated by applying a first-order lag filter operation to the DPF inlet temperature. The DPF inlet temperature is largely fluctuated by the discharging condition of the exhaust gas from the engine main body. Therefore, the first-order lag filter operation is applied to the DPF inlet temperature to eliminate the influence. Depending on required specification, a mere average or a weighted average of the DPF inlet temperature and the DPF outlet temperature may be employed as the DPF temperature T.

Figure 5:
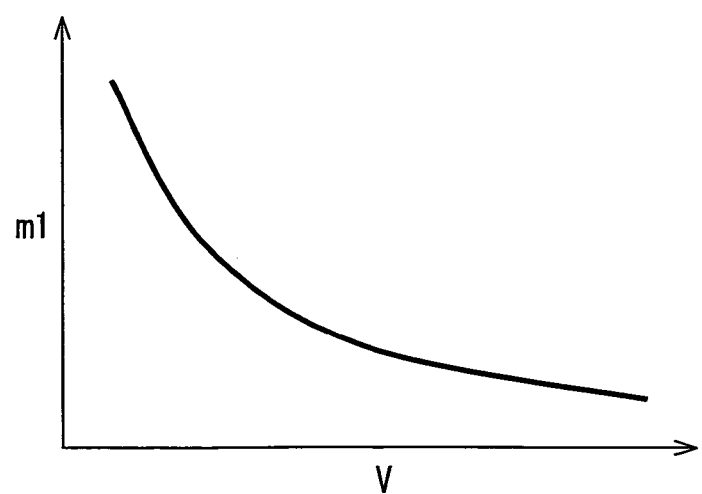
FIG. 5 is a graph showing a relationship between an exhaust gas flow rate and an estimation error of the first accumulation quantity estimation device according to the FIG. 1 embodiment.

As shown in FIG. 5, an estimation error m1 of the first accumulation quantity estimation device increases and the estimation accuracy decreases as the exhaust gas flow rate V decreases. In the case where the flow rate or temperature of the exhaust gas passing through the DPF 4 changes quickly, for example, during an acceleration period or a deceleration period of a vehicle, the relationship shown in FIG. 2 will be deviated, and it will become difficult to accurately estimate the PM accumulation quantity M. Therefore, a predetermined value V0 of the exhaust gas flow rate V above which the estimation error falls within a permissible range is set based on the relationship shown in FIG. 5. It is determined that the employment condition of the first accumulation quantity estimation device is satisfied if the calculated exhaust gas flow rate V is equal to or greater than the predetermined value V0 and the engine 1 is in a predetermined steady operating state. The steady operation of the engine 1 is determined based on direct information of the engine 1 such as a temporal change rate of the output of the engine rotation speed sensor 55 or the accelerator position sensor 56 or a temporal change rate of the intake air quantity GA, a temporal change rate of the exhaust gas temperature sensed by the temperature sensors 52a, 52b, or an index indicative of the gas-flowing state of the DPF 4 such as a temporal change rate of the differential pressure P across the DPF 4. If the temporal change rates are equal to or less than predetermined values, it is determined that the engine 1 is in the steady operating state.

The processing proceeds to Step S102 only in the case where the result of the determination at Step S101 is "YES." At Step S102, the PM accumulation quantity estimation by the first accumulation quantity estimation device is performed. The PM accumulation quantity M is calculated based on the relationship shown in FIG. 2 in accordance with the indexes indicative of the gas-flowing state of the engine 1 such as the exhaust gas flow rate V and the differential pressure P calculated at Step S101. Each one of curves shown in FIG. 2 indicates a combination of the exhaust gas flow rate V and the differential pressure P providing the same PM accumulation quantity M. Even in the case where the PM accumulation quantity M is the same, the differential pressure P decreases as the exhaust gas flow rate V decreases. These relationships are obtained beforehand through experimentation and the like and are stored in ROM of the ECU 51 as map data.

If the employment condition of the first accumulation quantity estimation device is not satisfied and the result of the determination at Step S101 is "NO," the processing proceeds to Step S103. For example, if the exhaust gas flow rate V is less than the predetermined value V0, the differential pressure P across the DPF 4 is low and it is difficult to accurately estimate the PM accumulation quantity M with the first accumulation quantity estimation device. In this case, the PM accumulation quantity estimation with the second accumulation quantity estimation device is performed at Step S103. At this time, the PM accumulation quantity M estimated by the first accumulation quantity estimation device at Step S102 in the cycle immediately before the determination at Step S101 is determined as "NO" is used as a base value, and a present PM accumulation quantity M is calculated by integrating an increment of the accumulation quantity per unit time calculated by the second accumulation quantity estimation device. The output torque of the engine 1 is calculated from the engine rotation speed sensed by the engine rotation speed sensor 55 and the accelerator position sensed by the accelerator position sensor 56, and the PM discharge quantity Md per unit time discharged from the engine 1 is calculated based on the relationship shown in FIG. 3. Each one of the curves shown in FIG. 3 indicates a relationship between the engine rotation speed RPM and the output torque (TORQUE) providing the same PM discharge quantity Md. In a low-speed and low-load operation area where the engine rotation speed RPM and the output torque are low, the PM discharge quantity Md is small. In a high-speed and high-load operation area where the engine rotation speed RPM and the output torque are high, the PM discharge quantity Md is large. These relationships are obtained beforehand through experimentation and the like and are stored in ROM of the ECU 51 as map data.

Thus-calculated PM discharge quantity per unit time is integrated as the accumulation quantity increment. The accumulation quantity increment is added to the PM accumulation quantity M calculated by the first accumulation quantity estimation device to renew the PM accumulation quantity M. Thus, in the case where the estimation device is switched from the first accumulation quantity estimation device to the second accumulation quantity estimation device, the PM accumulation quantity M estimated by the first accumulation quantity estimation device is used as the base value. Only in a period in which the first accumulation quantity estimation device is not employed, the second accumulation quantity estimation device estimates a change in the accumulation quantity. Thus, accumulation of the error ascribable to the second accumulation quantity estimation device can be minimized. As a result, accurate estimation of the accumulation quantity can be performed.

At step S103, the second accumulation quantity estimation device estimates the PM discharge quantity Md from the operation history of the engine 1 and calculates the accumulation quantity increment of the PM accumulation quantity M on the assumption that all the PM discharge quantity Md accumulates. At this time, in order to further improve the estimation accuracy of the second accumulation quantity estimation device, the estimate may be corrected by already known technologies such as correction based on oxygen concentration of the exhaust gas or correction based on intake pressure or temperature. The estimation accuracy can be further improved by multiplying the PM discharge quantity Md by a particulate matter collecting efficiency of the DPF 4. Further accurate estimation can be performed by suitably calculating a quantity of the particulate matters combusted on the DPF 4 based on the DPF temperature T and by subtracting the combusted quantity from the PM accumulation quantity.

At Step S1071, it is determined whether the PM accumulation quantity M estimated by the second accumulation quantity estimation device at Step S103 is "equal to or greater than" a predetermined value M0, at which the regeneration of the DPF 4 is necessary. If the result of the determination at Step S1071 is "YES," the processing proceeds to Step S108 and the exhaust gas flow rate increasing operation is aborted. Then, the regeneration of the DPF 4 is performed at Step S109.

If the result of the determination at Step S1071 is "NO," the processing proceeds to Step S104, where a continuing state of the accumulation quantity estimation by the second accumulation quantity estimation device is calculated. In this embodiment, an integrated value of a travel distance in a state in which the estimation by the second accumulation quantity estimation device continues uninterruptedly is calculated. The integrated value of the travel distance is calculated from the vehicle speed information. The index for determining the continuing state is not limited to the travel distance. A period in which the accumulation quantity estimation by the second accumulation quantity estimation device continues uninterruptedly or an integrated value of the fuel injection quantity during the period may be employed as the index.

At Step S105, it is determined whether an exhaust gas flow rate increasing condition is satisfied. For example, the travel distance in the state in which the estimation by the second accumulation quantity estimation device continues uninterruptedly is compared with a predetermined value A0. It is determined that the exhaust gas flow rate increasing condition is satisfied if the travel distance becomes equal to or greater than the predetermined value A0. The predetermined value A0 is set at a travel distance at which the estimation error due to the operation history of the engine 1 accumulates and exceeds a permissible limit, for example. Similar processing is performed also in the case where the continuing state is calculated based on the continuing period or the integrated value of the fuel injection quantity. If the exhaust gas flow rate increasing condition is not satisfied, the processing returns to Step S100 directly. The estimation error due to the operation history of the engine 1 is calculated based on a variation in the PM discharge quantity ascribable to a variation in the engine individual body, a change in the operating state (constant speed operation, accelerating operation, or decelerating operation), a change with time (change in characteristics after a long-term operation), or changes in the environment (temperature, pressure and the like) in the present operating state of the engine (engine rotation speed and torque). The error increases as the PM discharge quantity from the engine increases. Therefore, the method using the integrated value of the fuel injection quantity during the period, in which the estimation by the second accumulation quantity estimation device continues uninterruptedly, can provide a more suitable predetermined value A0 than a method using the continuing distance or the continuing period.

If the exhaust gas flow rate increasing condition is satisfied at Step S105, the processing proceeds to Step S106, where the exhaust gas flow rate increasing operation is performed. Then, the processing returns to Step S100. In the state in which the estimation by the second accumulation quantity estimation device continues uninterruptedly, the estimation error ascribable to the second accumulation quantity estimation device gradually accumulates. Therefore, there is a possibility that the estimation accuracy of the PM accumulation quantity will gradually decrease, correspondingly. In order to prevent the decrease of the estimation accuracy due to the long and continuous estimation by the second accumulation quantity estimation device, the exhaust gas flow rate V is increased to the predetermined value V0 or over. For example, a valve opening degree of the intake throttle is increased to increase the intake air quantity and the exhaust gas flow rate. If the engine 1 has an exhaust gas recirculation (EGR) system, a valve opening degree of an EGR valve is decreased to decrease the EGR quantity and to increase the exhaust gas flow rate. The exhaust gas flow rate can also be increased by increasing idling rotation speed, or by reducing an opening degree of a variable turbocharger.

Thus, the condition related to the exhaust gas flow rate as one of conditions to employ the first accumulation quantity estimation device at Step S101 can be satisfied. If the condition of the steady operation of the engine 1 as the other condition to employ the first accumulation quantity estimation device is satisfied, the estimation by the first accumulation quantity estimation device will become available. Accordingly, the opportunity of the estimation by the first accumulation quantity estimation device in the following cycles is largely increased, and accurate estimation can be performed.

At Step S107, it is determined whether the PM accumulation quantity M estimated by the first accumulation quantity estimation device at Step S102 is "equal to or greater than" the predetermined value M0, at which the regeneration of the DPF 4 is necessary. If the result of the determination at Step S107 is "NO," the processing returns directly to Step S100.

If the result of the determination at Step S107 is "YES," the exhaust gas flow rate increasing operation is aborted at Step S108, and the regeneration of the DPF 4 is performed at Step S109. As a temperature increasing method to regenerate the DPF 4, a post-injection is performed, for example. Thus, the temperature of the DPF 4 is increased to or above temperature at which the exhaust particulate matters are combusted.

An exhaust gas pressure upstream of the DPF 4 may be sensed to sense the gas-flowing state at the DPF 4, instead of the differential pressure across the DPF 4.

Figure 6:
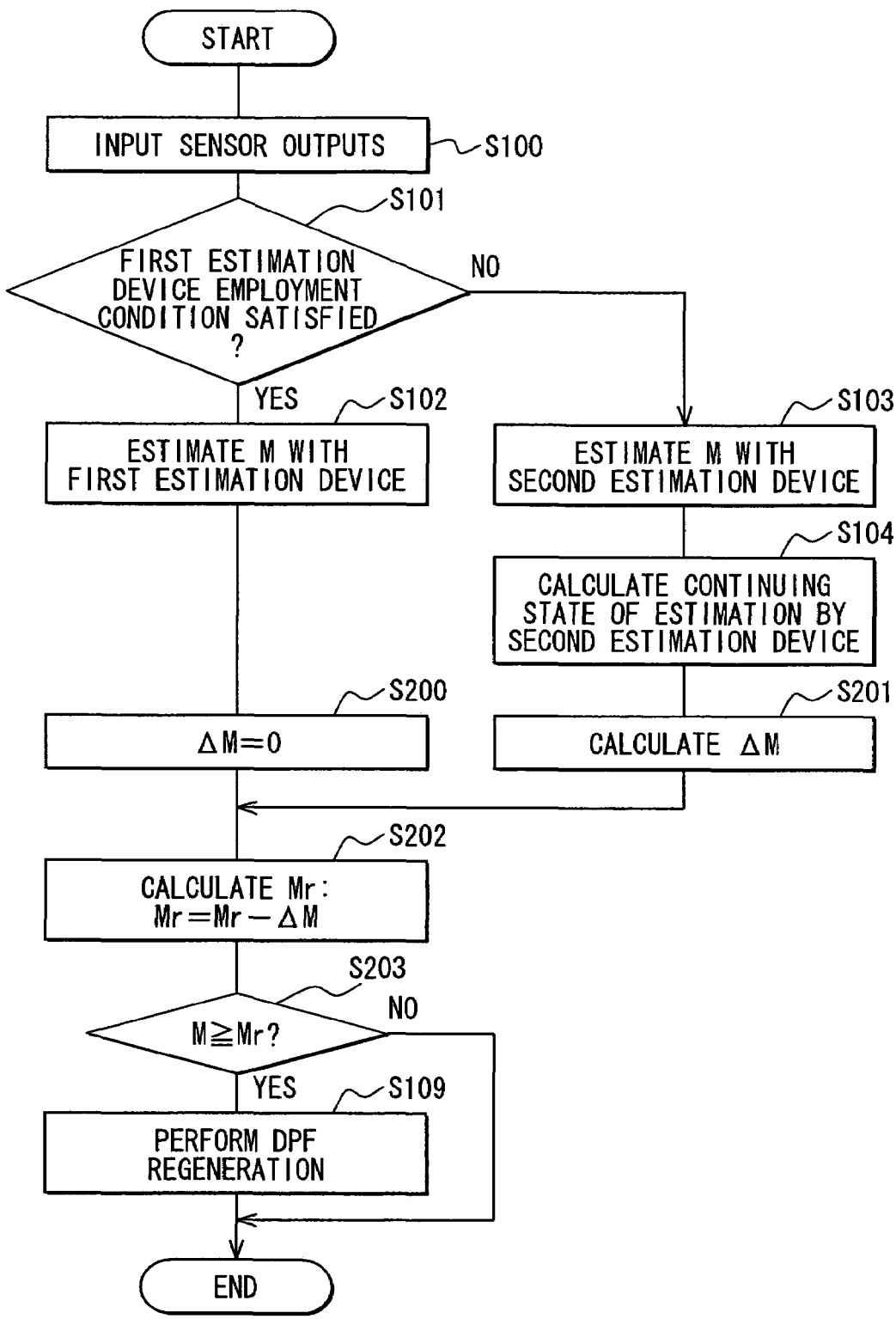
FIG. 6 is a flowchart showing processing steps of diesel particulate filter regeneration control performed by an electronic control unit of an exhaust gas purification system according to another example embodiment of the present invention.

Referring to FIG. 6, DPF regeneration control performed by an ECU 51 according to another embodiment of the present invention is illustrated. In the state in which the estimation by the second accumulation quantity estimation device continues uninterruptedly, the estimation error ascribable to the second accumulation quantity estimation device is gradually integrated. Therefore, there is a possibility that the estimation accuracy of the PM accumulation quantity gradually decreases, correspondingly. In this embodiment, in order to improve the estimation accuracy, a PM accumulation quantity (regeneration start PM accumulation quantity) Mr to start the DPF regeneration is set for each one of the first and second accumulation quantity estimation devices in consideration of the estimation error.

For example, a PM accumulation quantity estimation error m1 as a correction value of the first accumulation quantity estimation device with respect to a limit PM accumulation quantity M of the DPF 4 is set, and a PM accumulation quantity estimation error m2 as a correction value of the second accumulation quantity estimation device with respect to the limit PM accumulation quantity m is set. The regeneration start PM accumulation quantity Mr is calculated by subtracting the PM accumulation quantity estimation error m1 or the PM accumulation quantity estimation error m2 from the limit PM accumulation quantity m. For example, in the case where the DPF 4 is regenerated based on the first accumulation quantity estimation device, the regeneration start PM accumulation quantity Mr is calculated by subtracting the first estimation error m1 from the limit PM accumulation quantity m (Mr=m−m1). If the estimated PM accumulation quantity M reaches the regeneration start PM accumulation quantity Mr (=m−m1), the regeneration of the DPF 4 is performed. In the case where the DPF 4 is regenerated based on the second accumulation quantity estimation device, the regeneration start PM accumulation quantity Mr is calculated by subtracting the second estimation error m2 from the limit PM accumulation quantity m (Mr=m−m2). If the estimated PM accumulation quantity M reaches the regeneration start PM accumulation quantity Mr (=m−m2), the regeneration of the DPF 4 is performed.

The estimation error of the first accumulation quantity estimation device momentarily changes depending on present conditions of the engine 1 or the DPF 4. Accordingly, the error does not accumulate with time. Therefore, the PM accumulation quantity estimation error m1 is determined based on the momentary exhaust gas flow rate V and an engine steady operation index. For example, the PM accumulation quantity estimation error m1 is increased as the exhaust gas flow rate V decreases and the operating state of the engine 1 deviates further from the steady operating state (for example, the PM accumulation quantity estimation error m1 is increased as a temporal change rate of the engine rotation speed or the accelerator position increases). As for the estimation error of the second accumulation quantity estimation device, the momentary error accumulates. Therefore, the estimation error of the second accumulation quantity estimation device will increase as the estimation by the second accumulation quantity estimation device continues. The momentary error itself changes in accordance with a state of the engine 1 or the DPF 4. Therefore, for example, the error per unit time is calculated based on the engine operating conditions such as the engine rotation speed or output torque, and the error is integrated to calculate the PM accumulation quantity estimation error m2.

Preferably, when the estimation device is switched from the first accumulation quantity estimation device to the second accumulation quantity estimation device, the last accumulation quantity estimation error m1 of the first accumulation quantity estimation device should be used as a base value, and the present regeneration start accumulation quantity Mr should be calculated from an integrated value ΔM of the error per unit time during the continuation of the estimation by the second accumulation quantity estimation device. Thus, in the case where the estimation device is switched from the first accumulation quantity estimation device to the second accumulation quantity estimation device, the PM accumulation quantity M estimated by the first accumulation quantity estimation device is used as a base value and the change in the PM accumulation quantity M is estimated by the second accumulation quantity estimation device. Therefore, the estimation error of the PM accumulation quantity M can be expressed as a change of the error provided after the estimation device is changed to the second accumulation quantity estimation device. The error per unit time is integrated. The integrated value ΔM of the error per unit time is used as a reduction quantity and is subtracted from the regeneration start accumulation quantity Mr that is calculated based on the accumulation quantity estimation error m1. Thus, the regeneration start accumulation quantity Mr is renewed.

If the estimation device is switched from the first accumulation quantity estimation device to the second accumulation quantity estimation device, the last regeneration start accumulation quantity Mr calculated by the first accumulation quantity estimation device is used as the base value, and the regeneration start accumulation quantity Mr is renewed in consideration of the estimation error of the second accumulation quantity estimation device. The estimation error of the second accumulation quantity estimation device accumulates. Therefore, the integrated value ΔM of the error per unit time is used as the reduction quantity subtracted from the regeneration start accumulation quantity Mr of the first accumulation quantity estimation device at the time when the employment condition of the first accumulation quantity estimation device becomes unsatisfied after the employment condition is satisfied. Thus, the present regeneration start accumulation quantity Mr can be calculated easily. The accumulation of the estimation error due to the second accumulation quantity estimation device is included only in the integrated value ΔM of the error. Therefore, the regeneration start accumulation quantity Mr can be set suitably. Thus, the reliability of the regeneration determination can be improved.

Figure 7:
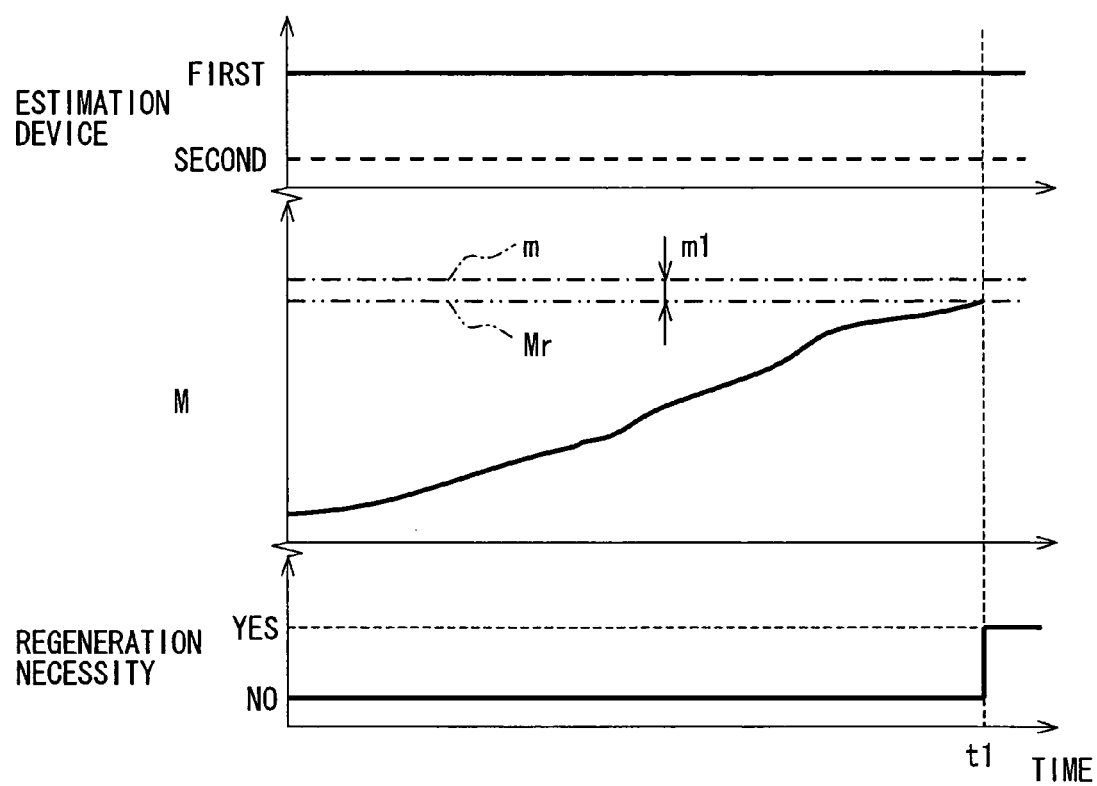
FIG. 7 is a time chart showing operation to start regeneration of the diesel particulate filter based on an estimate of a first accumulation quantity estimation device according to the FIG. 6 embodiment.
Figure 8:
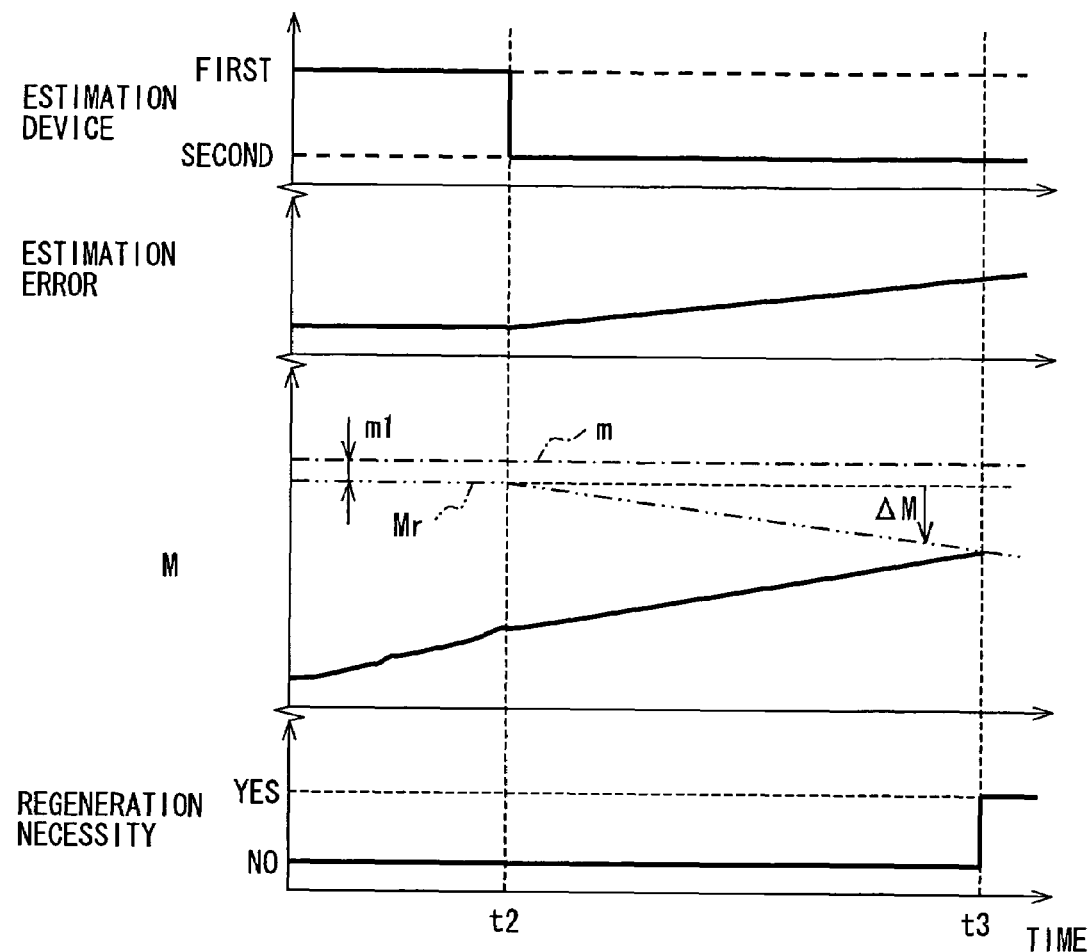
FIG. 8 is a time chart showing operation to start the regeneration of the diesel particulate filter based on an estimate of a second accumulation quantity estimation device according to the FIG. 6 embodiment.

The PM accumulation quantity estimation error m1 continuously changes depending on the present condition of the engine 1 or the DPF 4. In the following example, the momentary error of the first accumulation quantity estimation device is regarded as a fixed value. For example, the PM accumulation quantity estimation error m1 is regarded as a fixed value determined from an error anticipated within an operation range satisfying the employment condition. Likewise, the error of the second accumulation quantity estimation device per unit time is regarded as a constant fixed value. Thus, the integrated value ΔM is calculated. An example in which the momentary errors of the first and second accumulation quantity estimation devices are regarded as fixed values is shown in FIGS. 7 and 8. As shown in FIG. 7, the first accumulation quantity estimation device uses a correction value based on a constant fixed value as the PM accumulation quantity estimation error m1. The regeneration start PM accumulation quantity Mr is calculated by subtracting the PM accumulation quantity estimation error m1 from the limit PM accumulation quantity m. As shown in FIG. 8, the second accumulation quantity estimation device regards the error per unit time as a constant fixed value and calculates an integrated value ΔM of a correction value based on the error. The second accumulation quantity estimation device calculates the regeneration start PM accumulation quantity Mr by subtracting the integrated value ΔM from the regeneration start PM accumulation quantity Mr of the first accumulation quantity estimation device at the time when the employment condition of the first accumulation quantity estimation device becomes unsatisfied after the employment condition is satisfied. It should be noted that this embodiment is just an example and that the first and second accumulation quantity estimation devices may change the momentary errors in accordance with the operating state of the engine and the like.

Figure 9:
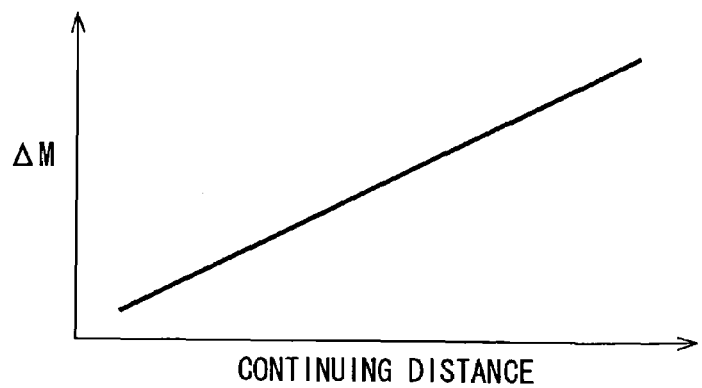
FIG. 9 is a graph showing a relationship between a continuing distance of the second accumulation quantity estimation device and a reduction quantity of a regeneration start particulate matter quantity according to the FIG. 6 embodiment.

Processing at Steps S100 to S104 and Step S109 of the flowchart shown in FIG. 6 is the same as that of the first embodiment. If the estimation by the second accumulation quantity estimation device is performed at Step S103, a continuing state of the estimation by the second accumulation quantity estimation device is calculated at Step S104. A reduction quantity ΔM of the regeneration start PM accumulation quantity Mr is calculated in accordance with the continuing state at Step S201. As shown in FIG. 7, the estimation error of the PM accumulation quantity M does not accumulate in the accumulation quantity estimation by the first accumulation quantity estimation device. The estimation error m1 (constant value, here) is subtracted from the limit PM accumulation quantity m to calculate the PM accumulation quantity (m−m1) for starting the regeneration. As shown in FIG. 8, if the estimation device is switched to the second accumulation quantity estimation device, the estimation error accumulates from the switched time point. The error per unit time since the time point when the estimation device is switched to the second accumulation quantity estimation device is integrated. In accordance with the integrated value, the reduction quantity ΔM to be subtracted from the regeneration start PM accumulation quantity Mr of the first accumulation quantity estimation device is calculated. A relationship between the continuing distance of the second accumulation quantity estimation device and the reduction quantity ΔM is shown in FIG. 9. The reduction quantity ΔM is increased as the continuing distance of the estimation by the second accumulation quantity estimation device extends.

The reduction quantity ΔM is determined beforehand in consideration of variations or temporal changes of characteristics of various parts of the exhaust gas purification system shown in FIG. 1 or changes of the environmental conditions. Thus, the reduction quantity ΔM is set to prevent excessive increase of the DPF temperature due to rapid combustion of the particulate matters (highest temperature inside the DPF 4<permissible temperature) even if the vehicle is driven or the DPF 4 is regenerated in a state in which a deviation of the estimate of the second accumulation quantity estimation device from the actual value is maximized (estimate<actual value).

The estimation error is gradually integrated during the estimation by the second accumulation quantity estimation device. Accordingly, the estimation accuracy will be deteriorated gradually. The cumulative error corresponding to the travel distance in a state in which the estimation by the second accumulation quantity estimation device continues is used as the reduction quantity ΔM. The regeneration start PM accumulation quantity Mr is reduced by the reduction quantity ΔM. If the estimation by the first accumulation quantity estimation device is performed at Step S102, the reduction quantity ΔM is reset to zero at Step S200. The travel distance during the continuation of the estimation by the second accumulation quantity estimation device is used as the index of the continuing state. Alternatively, the continuing period or the integrated value of the fuel injection quantity may be used in place of the travel distance.

At Step S202, an accumulation quantity calculated by subtracting the reduction quantity ΔM calculated at Step S201 from the regeneration start PM accumulation quantity Mr is set as a renewed regeneration start PM accumulation quantity Mr. The reduction quantity ΔM has been reset to 0 since Step S200 in the case where the accumulation quantity estimation by the first accumulation quantity estimation device is performed. Therefore, in such a case, the regeneration start PM accumulation quantity Mr remains an initial value.

At Step S203, the PM accumulation quantity M estimated by the first accumulation quantity estimation device at Step S102 or the PM accumulation quantity M estimated by the second accumulation quantity estimation device at Step S103 is compared with the regeneration start PM accumulation quantity Mr calculated at Step S202. If the PM accumulation quantity M is equal to or greater than the regeneration start PM accumulation quantity Mr, the regeneration of the DPF 4 is performed at Step S109. If the result of the determination at Step S203 is "NO," the processing is ended.

A time chart to start the regeneration of the DPF 4 based on the estimate of the first accumulation quantity estimation device is shown in FIG. 7. As shown in FIG. 7, the PM accumulation quantity estimate M of the first accumulation quantity estimation device gradually increases. It is determined that the regeneration is necessary at time t1 when the estimated PM accumulation quantity M reaches the regeneration start PM accumulation quantity Mr. Thus, the DPF regeneration is started. A time chart to start the regeneration of the DPF 4 based on the estimate of the second accumulation quantity estimation device is shown in FIG. 8. As shown in FIG. 8, the PM accumulation quantity M is estimated by the second accumulation quantity estimation device after time t2. The PM accumulation quantity estimation error will accumulate as the estimation by the second accumulation quantity estimation device continues. In order to regenerate the DPF 4 safely, the reduction quantity ΔM is gradually increased and the regeneration start PM accumulation quantity Mr is gradually decreased as the continuing distance, in which the estimation by the second accumulation quantity estimation device continues, extends as shown in FIG. 9. It is determined that the regeneration is necessary at time t3 when the PM accumulation quantity M estimated by the second accumulation quantity estimation device reaches the regeneration start PM accumulation quantity Mr that gradually decreases.

In this embodiment, while the estimation by the second accumulation quantity estimation device continues, the regeneration start PM accumulation quantity is reduced in accordance with the continuing state of the estimation and the regeneration start is determined in consideration of the estimation error. Accordingly, the regeneration can be performed suitably, and the excessive accumulation of the exhaust particulate matters over the limit accumulation quantity can be prevented. Thus, the regeneration start in a state in which excessive particulate matters accumulate can be prevented even if the regeneration is started by the second accumulation quantity estimation device, the estimation error of which accumulates and increases in accordance with the continuing period of the estimation. Thus, the DPF 4 can be regenerated safely.

Figure 10:
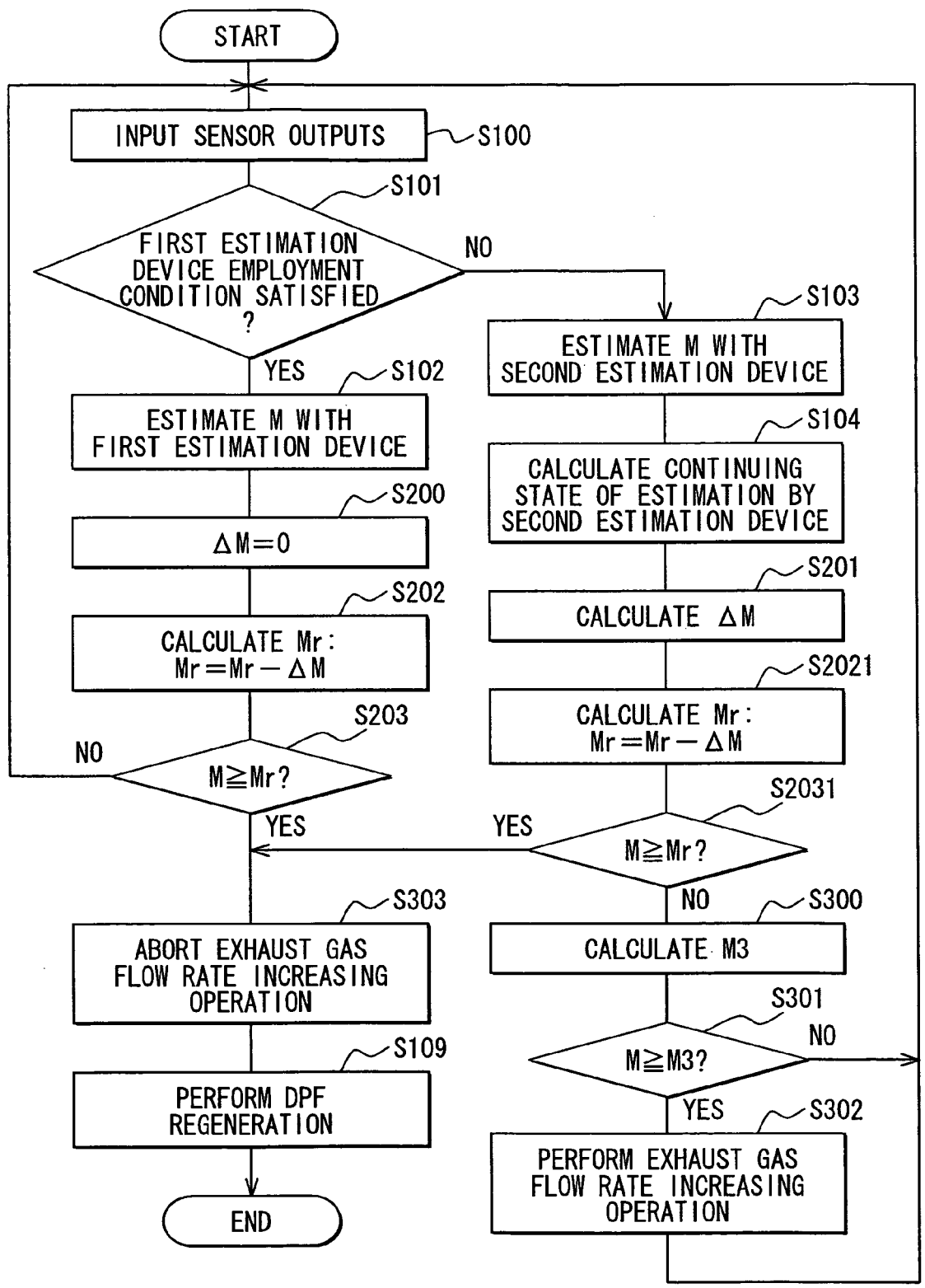
FIG. 10 is a flowchart showing processing steps of diesel particulate filter regeneration control performed by an electronic control unit of an exhaust gas purification system according to yet another example embodiment of the present invention.

Referring to FIG. 10, DPF regeneration control performed by an ECU 51 according to yet another embodiment of the present invention is illustrated. Processing at Steps S100 to S104 and Step S109 of the flowchart shown in FIG. 10 is the same as that of the first embodiment. Processing at Steps S200 to S203 is the same as that of the second embodiment. If the estimation by the second accumulation quantity estimation device is performed at Step S103, a continuing state of the estimation by the second accumulation quantity estimation device is calculated at Step S104. A reduction quantity ΔM of the regeneration start PM accumulation quantity Mr is calculated at Step S201. The regeneration start PM accumulation quantity Mr is calculated at Step S2021. It is determined whether the PM accumulation quantity M estimated by the second accumulation quantity estimation device is "equal to or greater than" the regeneration start PM accumulation quantity Mr at Step S2031. If the result of the determination at Step S2031 is "YES," the processing proceeds to Step S303, where the exhaust gas flow rate increasing operation is aborted. Then, the regeneration of the DPF 4 is performed at Step S109. If the result of the determination at Step S2031 is "NO," an exhaust gas flow rate increase determination accumulation quantity M3 is calculated based on a graph shown in FIG. 12.

Figure 11:
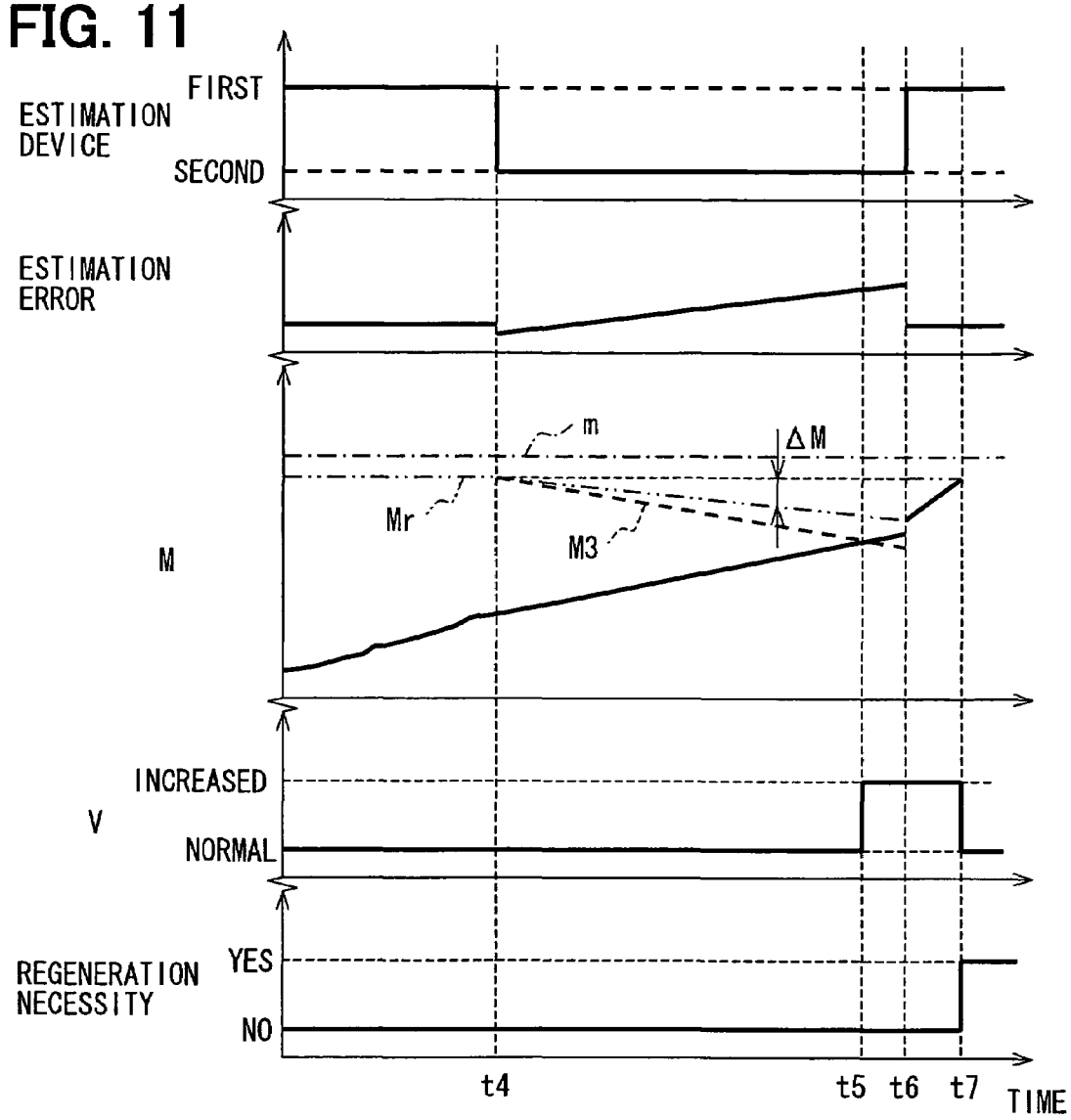
FIG. 11 is a time chart showing operation to start the regeneration of the diesel particulate filter based on an estimate of a second accumulation quantity estimation device according to the FIG. 10 embodiment.
Figure 12:
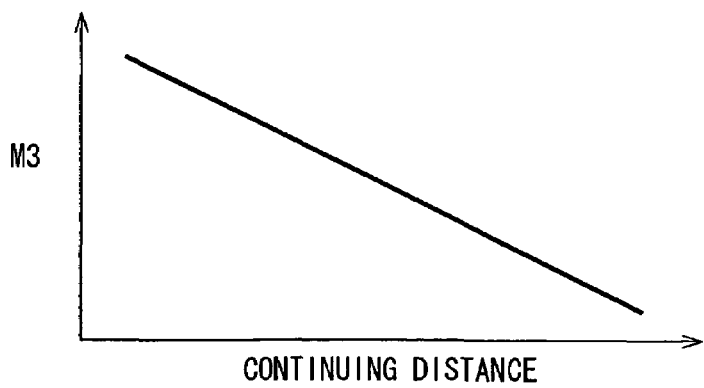
FIG. 12 is a graph showing a relationship between a travel distance in a state in which the estimation by the second accumulation quantity estimation device continues and an exhaust gas flow rate increase determination accumulation quantity according to the FIG. 10 embodiment.

Thus, if there is a high possibility that the regeneration is started based on the output of the second accumulation quantity estimation device having relatively low estimation accuracy due to the reduction of the regeneration start PM accumulation quantity Mr as in the second embodiment, the exhaust gas flow rate V is compulsorily increased like the first embodiment. Thus, the opportunity to perform the estimation with the first accumulation quantity estimation device can be increased. As shown in FIG. 11, the exhaust gas flow rate increase determination accumulation quantity M3 is set at a further smaller value than the value provided by subtracting the value ΔM from the regeneration start PM accumulation quantity Mr. As shown in FIG. 12, the exhaust gas flow rate increase determination accumulation quantity M3 is decreased as the travel distance (continuing distance) during the continuation of the estimation by the second accumulation quantity estimation device extends. If the exhaust gas flow rate increase determination accumulation quantity M3 is set too small, there is a possibility that drivability is deteriorated due to the increase of the exhaust gas flow rate V. The exhaust gas flow rate increase determination accumulation quantity M3 should be set at a suitable value capable of preventing the deterioration of the drivability.

In this embodiment, the continuing distance is used as the index indicating the continuation of the estimation by the second accumulation quantity estimation device as in the first or second embodiment. Instead of the continuing distance, the traveling period under the continuation or the integrated value of the fuel injection quantity during the continuation can be used as the index.

At Step S301, it is determined whether the PM accumulation quantity M estimated by the second accumulation quantity estimation device is "equal to or greater than" the exhaust gas flow rate increase determination accumulation quantity M3. If the result of the determination at Step S301 is "YES," the processing proceeds to Step S302, where the exhaust gas flow rate increasing operation is performed. Then, the processing returns to Step S100. The estimation error gradually accumulates and the estimation accuracy of the PM accumulation quantity gradually decreases as the estimation by the second accumulation quantity estimation device continues. Therefore, in order to satisfy the employment condition of the first accumulation quantity estimation device, the exhaust gas flow rate V is increased to the predetermined value V0 or over. The exhaust gas flow rate increasing operation at this step can be performed by reducing the EGR quantity, by increasing the opening degree of the intake throttle, by increasing the idling rotation speed, or by reducing the opening degree of the variable turbocharger. If the result of the determination at Step S301 is "NO," the processing returns directly to Step S100.

The regeneration start PM accumulation quantity Mr is calculated at Step S202. It is determined whether the PM accumulation quantity M estimated by the first accumulation quantity estimation device is "equal to or greater than" the regeneration start PM accumulation quantity Mr at Step S203. If the result of the determination at Step S203 is "YES," the processing proceeds to Step S303, where the exhaust gas flow rate increasing operation is aborted. Then, the regeneration of the DPF 4 is performed at Step S109. If the result of the determination at Step S203 is "NO," the processing returns directly to Step S100.

A time chart to start the regeneration operation of the DPF 4 based on the estimate of the second accumulation quantity estimation device of the this embodiment is shown in FIG. 11. As shown in FIG. 11, the PM accumulation quantity M is estimated by the second accumulation quantity estimation device after time t4. The PM accumulation quantity estimation error accumulates and increases as the estimation continues. As in the second embodiment, while the estimation by the second accumulation quantity estimation device continues, the regeneration start PM accumulation quantity is gradually decreased with the use of the reduction quantity ΔM corresponding to the continuing distance (shown in FIG. 9). In this embodiment, the exhaust gas flow rate increase determination accumulation quantity M3 that is smaller than the regeneration start PM accumulation quantity is calculated and the exhaust gas flow rate increasing condition is determined. The value M3 is gradually decreased as the estimation by the second accumulation quantity estimation device continues as shown in FIG. 12. The exhaust gas flow rate increasing operation is performed at time t5 when the PM accumulation quantity M estimated by the second accumulation quantity estimation device reaches the exhaust gas flow rate increase determination accumulation quantity M3.

In this example, since the exhaust gas flow rate V is increased at the time t5, the employment condition of the first accumulation quantity estimation device is satisfied at time t6. The estimation by the first accumulation quantity estimation device is performed after the time t6. If the accumulation quantity is estimated by the first accumulation quantity estimation device, the reduction quantity ΔM of the regeneration start PM accumulation quantity Mr is zero (ΔM=0). Thus, the necessity of the regeneration is determined based on the normal regeneration start PM accumulation quantity. If the PM accumulation quantity M estimated by the first accumulation quantity estimation device exceeds the regeneration start PM accumulation quantity Mr at time t7, it is determined that the regeneration is necessary, and the regeneration is started.

Thus, by introducing the exhaust gas flow rate increasing operation in addition to the reduction of the regeneration start PM accumulation quantity, the estimation of the PM accumulation quantity can be performed further accurately. The condition to employ the estimate of the first accumulation quantity estimation device is satisfied if the exhaust gas flow rate V is equal to or greater than the predetermined value V0 and the engine 1 is in a predetermined steady operating state. By increasing the exhaust gas flow rate to satisfy the condition that the exhaust gas flow rate V is equal to or greater than the value V0, the first accumulation quantity estimation device can be employed if a single condition that the engine 1 is in the predetermined steady operating state is satisfied. As a result, the opportunity to employ the first accumulation quantity estimation device having the relatively high accuracy is largely increased, and the effect of preventing the excessive accumulation of the exhaust particulate matters and of providing a suitable regeneration frequency can be further improved.

The present invention should not be limited to the disclosed embodiments, but may be implemented in many other ways without departing from the spirit of the invention.

What is claimed is:

1. An exhaust gas purification system of an internal combustion engine having a particulate filter located in an exhaust passage of the engine for collecting exhaust particulate matters, the exhaust gas purification system regenerating the particulate filter by eliminating the exhaust particulate matters collected by the particulate filter, the exhaust gas purification system comprising:
    a flowing state sensing device that senses a flowing state of exhaust gas at the particulate filter;
    a first accumulation quantity estimation device that estimates an accumulation quantity of the exhaust particulate matters in the particulate filter based on the flowing state of the exhaust gas;
    an operating state sensing device that senses an operating state of the engine;
    a second accumulation quantity estimation device that estimates the accumulation quantity of the exhaust particulate matters in the particulate filter based on the operating state of the engine;
    an employment condition determination device that determines whether employment conditions to employ the first accumulation quantity estimation device including a condition that a flow rate of the exhaust gas flowing through the exhaust passage is equal to or greater than a predetermined flow rate are satisfied; and
    a regeneration start accumulation quantity calculation device including an estimation error calculation device that calculates an estimation error representing a correction value of the first or second accumulation quantity estimation device with respect to a limit accumulation quantity of the exhaust particulate matters in the particulate filter, wherein the regeneration start accumulation quantity calculation device calculates a regeneration start accumulation quantity for starting the regeneration of the particulate filter by subtracting the estimation error of the first or second accumulation quantity estimation device from the limit accumulation quantity.

2. The exhaust gas purification system as in claim 1, further comprising:
    a regeneration determination device that selects the first accumulation quantity estimation device when the employment conditions of the first accumulation quantity estimation device are satisfied and selects the second accumulation quantity estimation device when the employment conditions are not satisfied, wherein the regeneration determination device compares the accumulation quantity estimated by the selected accumulation quantity estimation device with the regeneration start accumulation quantity corresponding to the selected accumulation quantity estimation device to determine whether regeneration operation of the particulate filter should be performed.

3. The exhaust gas purification system as in claim 1, wherein the estimation error calculation device determines the estimation error of the first accumulation quantity estimation device based on the flow rate of the exhaust gas flowing through the exhaust passage and an index indicative of a steady operating state of the engine at a time when the estimation error is calculated.

4. The exhaust gas purification system as in claim 1, wherein the estimation error calculation device calculates the estimation error of the second accumulation quantity estimation device by integrating an error per unit time calculated based on the operating state of the engine.

5. The exhaust gas purification system as in claim 1, wherein the regeneration start accumulation quantity calculation device, if the second accumulation quantity estimation device is selected when the employment conditions of the first accumulation quantity estimation device become unsatisfied after the employment conditions are satisfied, calculates a present regeneration start accumulation quantity by subtracting an integrated value of the error per unit time of the second accumulation quantity estimation device, the integrated value being calculated since the first accumulation quantity estimation device is switched to the second accumulation quantity estimation device, from the regeneration start accumulation quantity calculated based on the last accumulation quantity estimation error of the first accumulation quantity estimation device.

6. The exhaust gas purification system as in claim 1, further comprising:
    a continuing state sensing device that senses a continuing state of the accumulation quantity estimation performed by the second accumulation quantity estimation device; and
    an exhaust gas flow rate increasing device that increases a flow rate of the exhaust gas when the accumulation quantity estimation performed by the second accumulation quantity estimation device continues for a predetermined period or longer and before the estimated accumulation quantity reaches the regeneration start accumulation quantity of the second accumulation quantity estimation device.

7. The exhaust gas purification system as in claim 1, wherein the second accumulation quantity estimation device, if the second accumulation quantity estimation device is selected when the employment conditions of the first accumulation quantity estimation device become unsatisfied after the employment conditions are satisfied, calculates a present accumulation quantity of the exhaust particulate matters by adding an integrated value of an increment of the accumulation quantity of the exhaust particulate matters per unit time, the increment being calculated by the second accumulation quantity estimation device since the second accumulation quantity estimation device is selected to replace the first accumulation quantity estimation device, to the last accumulation quantity of the exhaust particulate matters estimated by the first accumulation quantity estimation device.

8. An exhaust gas purification system of an internal combustion engine having a particulate filter located in an exhaust passage of the engine for collecting exhaust particulate matters, the exhaust gas purification system regenerating the particulate filter by eliminating the exhaust particulate matters collected by the particulate filter, the exhaust gas purification system comprising:
   a flowing state sensing device that senses a flowing state of exhaust gas at the particulate filter;
   a first accumulation quantity estimation device that estimates an accumulation quantity of the exhaust particulate matters in the particulate filter based on the flowing state of the exhaust gas;
   an operating state sensing device that senses an operating state of the engine;
   a second accumulation quantity estimation device that estimates the accumulation quantity of the exhaust particulate matters in the particulate filter based on the operating state of the engine;
   an employment condition determination device that determines whether employment conditions to employ the first accumulation quantity estimation device including a condition that a flow rate of the exhaust gas flowing through the exhaust passage is equal to or greater than a predetermined flow rate are satisfied;
   a regeneration determination device that selects the first accumulation quantity estimation device when the employment conditions of the first accumulation quantity estimation device are satisfied and selects the second accumulation quantity estimation device when the employment conditions are not satisfied, wherein the regeneration determination device compares the accumulation quantity estimated by the selected accumulation quantity estimation device with a predetermined quantity to determine whether regeneration operation of the particulate filter should be performed;
   a continuing state sensing device that senses a continuing state of the accumulation quantity estimation performed by the second accumulation quantity estimation device; and
   an exhaust gas flow rate increasing device that increases the exhaust gas flow rate if the accumulation quantity estimation by the second accumulation quantity estimation device continues for a predetermined period or longer when the regeneration of the particulate filter is not performed.

9. The exhaust gas purification system as in claim 8, wherein:
   the continuing state sensing device senses the continuing state of the estimation based on a continuing distance or a continuing period, through which the estimation by the second accumulation quantity estimation device continues, or an integrated value of a fuel injection quantity injected in the continuing period, and
   the exhaust gas flow rate increasing device increases the exhaust gas flow rate to the predetermined flow rate or over if a value representing the continuing state becomes equal to or greater than a predetermined value.

10. The exhaust gas purification system as in claim 8, wherein the employment condition determination device determines that the employment conditions of the first accumulation quantity estimation device are satisfied if the flow rate of the exhaust gas flowing through the exhaust passage is equal to or greater than the predetermined flow rate and the engine is in a predetermined steady operating state.

11. The exhaust gas purification system as in claim 8, wherein the second accumulation quantity estimation device, if the second accumulation quantity estimation device is selected when the employment conditions of the first accumulation quantity estimation device become unsatisfied after the employment conditions are satisfied, calculates a present accumulation quantity of the exhaust particulate matters by adding an integrated value of an increment of the accumulation quantity of the exhaust particulate matters per unit time, the increment being calculated by the second accumulation quantity estimation device since the second accumulation quantity estimation device is selected to replace the first accumulation quantity estimation device, to the last accumulation quantity of the exhaust particulate matters estimated by the first accumulation quantity estimation device.

12. A method of purifying exhaust of an internal combustion engine, the internal combustion engine having a particulate filter which is located in an exhaust passage of the engine for collecting exhaust particulate matters and is regenerated by eliminating the exhaust particulate matters collected by the particulate filter, the method comprising:
   sensing a flowing state of exhaust gas at the particulate filter;
   estimating, with a first estimation device, an accumulation quantity of the exhaust particulate matters in the particulate filter based on the flowing state of the exhaust gas;
   sensing an operating state of the engine;
   estimating, with a second estimation device, the accumulation quantity of the exhaust particulate matters in the particulate filter based on the operating state of the engine;
   determining whether employment conditions to employ the first estimation device including a condition that a flow rate of the exhaust gas flowing through the exhaust passage is equal to or greater than a predetermined flow rate are satisfied; and
   calculating an estimation error representing a correction value of the first or second estimation device with respect to a limit accumulation quantity of the exhaust particulate matters in the particulate filter; and
   calculating a regeneration start accumulation quantity for starting the regeneration of the particulate filter by subtracting the estimation error of the first or second estimation device from the limit accumulation quantity.

13. The method as in claim 12, further comprising:
   selecting the first estimation device when the employment conditions of the first estimation device are satisfied and selecting the second estimation device when the employment conditions are not satisfied,
   wherein the accumulation quantity estimated by the selected estimation device is compared with the regeneration start accumulation quantity corresponding to the selected estimation device to determine whether regeneration operation of the particulate filter should be performed.

14. The method as in claim 12, wherein the estimation error of the first estimation device is determined based on the flow rate of the exhaust gas flowing through the exhaust passage and an index indicative of a steady operating state of the engine at a time when the estimation error is calculated.

15. The method as in claim 12, wherein the estimation error of the second estimation device is calculated by integrating an error per unit time calculated based on the operating state of the engine.

16. The method as in claim 12, wherein, if the second estimation device is selected when the employment conditions of the first estimation device become unsatisfied after the employment conditions are satisfied, a present regeneration start accumulation quantity is calculated by subtracting an integrated value of the error per unit time of the second estimation device, the integrated value being calculated since the first estimation device is switched to the second estimation device, from the regeneration start accumulation quantity calculated based on the last accumulation quantity estimation error of the first estimation device.

17. The method as in claim 12, further comprising:
sensing a continuing state of the accumulation quantity estimation performed by the second estimation device; and
increasing a flow rate of the exhaust gas when the accumulation quantity estimation performed by the second estimation device continues for a predetermined period or longer and before the estimated accumulation quantity reaches the regeneration start accumulation quantity of the second estimation device.

18. The method as in claim 12, wherein the second estimation device, if the second estimation device is selected when the employment conditions of the first estimation device become unsatisfied after the employment conditions are satisfied, calculates a present accumulation quantity of the exhaust particulate matters by adding an integrated value of an increment of the accumulation quantity of the exhaust particulate matters per unit time, the increment being calculated by the second estimation device since the second estimation device is selected to replace the first estimation device, to the last accumulation quantity of the exhaust particulate matters estimated by the first estimation device.

19. A method of purifying exhaust gas of an internal combustion engine having a particulate filter which is located in an exhaust passage of the engine for collecting exhaust particulate matters and is regenerated by eliminating the exhaust particulate matters collected by the particulate filter, the method comprising:
sensing a flowing state of exhaust gas at the particulate filter;
estimating, with a first estimation device, an accumulation quantity of the exhaust particulate matters in the particulate filter based on the flowing state of the exhaust gas;
sensing an operating state of the engine;
estimating, with a second estimation device, the accumulation quantity of the exhaust particulate matters in the particulate filter based on the operating state of the engine;
determining whether employment conditions to employ the first estimation device including a condition that a flow rate of the exhaust gas flowing through the exhaust passage is equal to or greater than a predetermined flow rate are satisfied;
selecting the first estimation device when the employment conditions of the first estimation device are satisfied and selecting the second estimation device when the employment conditions are not satisfied, wherein the accumulation quantity estimated by the selected estimation device is compared with a predetermined quantity to determine whether regeneration operation of the particulate filter should be performed;
sensing a continuing state of the accumulation quantity estimation performed by the second estimation device; and
increasing the exhaust gas flow rate if the accumulation quantity estimation by the second estimation device continues for a predetermined period or longer when the regeneration of the particulate filter is not performed.

20. The method as in claim 19, wherein:
the continuing state of the estimation is sensed based on a continuing distance or a continuing period, through which the estimation by the second estimation device continues, or an integrated value of a fuel injection quantity injected in the continuing period, and
the exhaust gas flow rate is increased to the predetermined flow rate or over if a value representing the continuing state becomes equal to or greater than a predetermined value.

21. The method as in claim 19, wherein a determination is made that the employment conditions of the first estimation device are satisfied if the flow rate of the exhaust gas flowing through the exhaust passage is equal to or greater than the predetermined flow rate and the engine is in a predetermined steady operating state.

22. The method as in claim 19, wherein the second estimation device, if the second estimation device is selected when the employment conditions of the first estimation device become unsatisfied after the employment conditions are satisfied, calculates a present accumulation quantity of the exhaust particulate matters by adding an integrated value of an increment of the accumulation quantity of the exhaust particulate matters per unit time, the increment being calculated by the second estimation device since the second estimation device is selected to replace the first estimation device, to the last accumulation quantity of the exhaust particulate matters estimated by the first estimation device.

* * * * *